United States Patent
Vanhatupa et al.

(10) Patent No.: US 10,306,480 B2
(45) Date of Patent: May 28, 2019

(54) SELECTION TOOL FOR ACCESS POINT POSITIONS

(71) Applicant: Ekahau Oy, Helsinki (FI)

(72) Inventors: Timo Vanhatupa, Hameenlinna (FI); Teemu Pulkkinen, Espoo (FI)

(73) Assignee: EKAHAU OY (FI)

( * ) Notice: Subject to any disclaimer, the term of this patent is extended or adjusted under 35 U.S.C. 154(b) by 0 days.

(21) Appl. No.: 16/009,966

(22) Filed: Jun. 15, 2018

(65) Prior Publication Data

US 2018/0368001 A1    Dec. 20, 2018

(30) Foreign Application Priority Data

Jun. 19, 2017   (FI) .................................. 20175574

(51) Int. Cl.
*H04W 16/18*   (2009.01)
(52) U.S. Cl.
CPC .................................. *H04W 16/18* (2013.01)
(58) Field of Classification Search
CPC ..... H04W 16/18; H04W 16/00; H04W 16/24; H04W 16/32
See application file for complete search history.

(56) References Cited

U.S. PATENT DOCUMENTS

| | | | |
|---|---|---|---|
| 7,055,107 B1 | 5/2006 | Rappaport et al. | |
| 9,805,115 B1* | 10/2017 | Satish | G06F 17/30705 |
| 2010/0150027 A1 | 6/2010 | Atwal et al. | |
| 2011/0274083 A1* | 11/2011 | Bazzo | H04W 36/22 |
| | | | 370/331 |
| 2011/0292050 A1* | 12/2011 | Gotz | G06T 13/00 |
| | | | 345/441 |
| 2014/0149504 A1* | 5/2014 | Bosworth | H04L 65/403 |
| | | | 709/204 |
| 2015/0247915 A1* | 9/2015 | Huang | G01S 5/0205 |
| | | | 455/456.1 |
| 2016/0127916 A1 | 5/2016 | Li et al. | |
| 2016/0294636 A1* | 10/2016 | Kalika | H04N 21/4126 |

FOREIGN PATENT DOCUMENTS

| | | | |
|---|---|---|---|
| WO | WO 2008094993 | 8/2008 | |
| WO | WO-2008094993 A1 * | 8/2008 | ............ H04W 16/20 |

OTHER PUBLICATIONS

Kumar et al., Effective Segmentation of Image Using Thresholding of Lloyds, IJESC, Aug. 2015, pp. 1744-1746 (Year: 2015).*

* cited by examiner

*Primary Examiner* — Said M Elnoubi
(74) *Attorney, Agent, or Firm* — Squire Patton Boggs (US) LLP

(57) ABSTRACT

A solution how to calculate locations scores that depict the quality of specific locations as an installation point of an access point is disclosed. To calculate a location score a network planning area is divided into location topology cells, and in each location topology cell a plurality of predefined metrics that take into account environment are calculated. Then the metrics are converted into metric scores, and from the metric scores a location score for a location topology cell is calculated. Further, a solution in which final positions of access points are determined in a two-step procedure is disclosed. Firstly, initial positions are determined based on received planning information. Then final positions are determined starting from the initial positions and using both planning information and location scores.

20 Claims, 5 Drawing Sheets

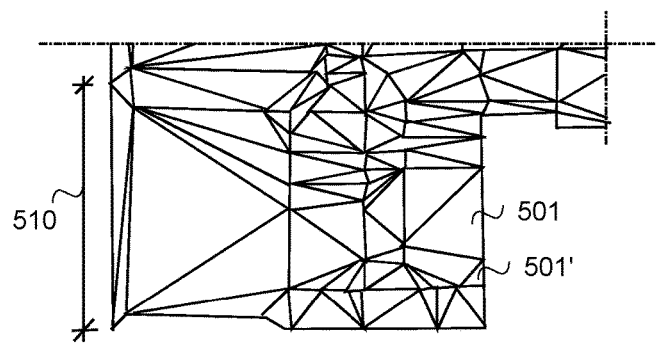
*Figre 5*
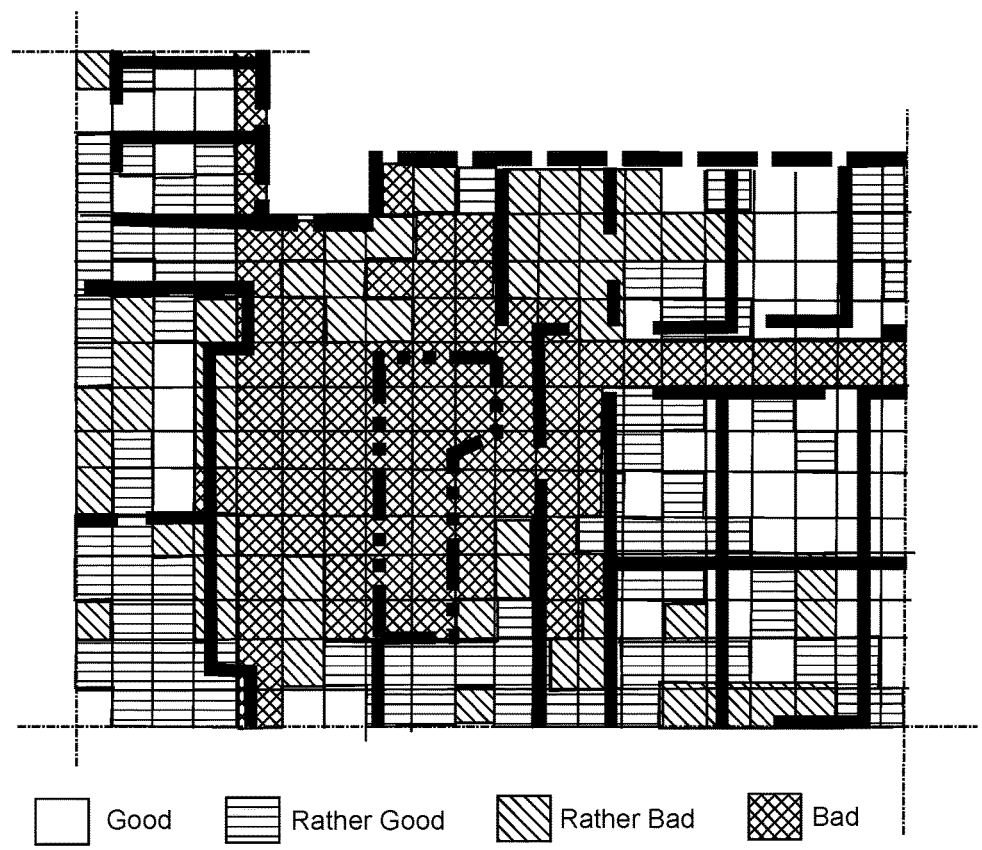
*Figure 6*

SELECTION TOOL FOR ACCESS POINT POSITIONS

RELATED APPLICATIONS

This application claims priority to Finnish patent application no. 20175574, filed on Jun. 19, 2017, the contents of which is hereby incorporated herein by reference in its entirety.

FIELD

The invention relates to radio network planning.

BACKGROUND

A typical wireless network includes plurality of access points providing wireless access. There are a wide variety of network planning tools available for wireless network planning and design to create, based on requirements given by a user and information on a physical environment, network plans that indicate where to place access points, and possibly also how to configure the access points to provide wireless access fulfilling the requirements.

Network planning tools are configured to start from an initial network plan that defines access point positions and parameters for radios the access points contain, and to modify the network plan iteratively using at least one of an objective function estimating how good the plan is and/or a set of requirements for capacity and/or coverage that need to be fulfilled. When the set of requirements is used, the iterative modifying of the network plan continues until all the requirements in the set are fulfilled. When the objective function is used, the iterative modifying of the network plan continues until a better network plan, judged by the objective function, is not found. If both the set of requirements and the objective function are used, the iterative modifying of the network plan continues until a plan filling all the requirements in the set that is the best based on the objective function is found. However, the set of requirements does not take into account the environment, and in order to find the best plan within reasonable time, the objective functions used are rather simple and do not cover the exact positions of access points with enough detail to provide the optimum final positions of access points.

A position of each access point has a paramount importance for the operation and performance of a network, and a small change in an access point's position may have a huge impact, for the operation and performance. When deciding final positions of the access points signal propagation, interference, and obstacles, such as structures, and the like, affecting to signal propagation in an environment where the network is to be built, should be taken into account.

SUMMARY

The invention relates to a method, a program product, and an apparatus which are characterized by what is stated in the independent claims. The preferred embodiments are disclosed in the dependent claims.

An aspect introduces a solution how to calculate locations scores. A location score is a value depicting the quality of a specific location as an installation point of an access point. According to the aspect a network planning area is divided into smaller areas called location topology cells, and in each location topology cell a plurality of predefined metrics that take into account environment, such as propagation obstacles, are calculated. Then the metrics are converted into metric scores, and from the metric scores a location score for the location topology cell is calculated.

Another aspect introduces a solution in which final positions of access points are determined in a two-step procedure. Firstly, initial positions are determined based on received planning information. Then final positions are determined starting from the initial positions and using both planning information and location scores.

BRIEF DESCRIPTION OF THE DRAWINGS

In the following different embodiments of the invention will be described in greater detail with reference to the attached drawings, in which:

FIG. 5 illustrates a location topology;
FIG. 6 illustrates an exemplary view displayed.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

Figure 1:
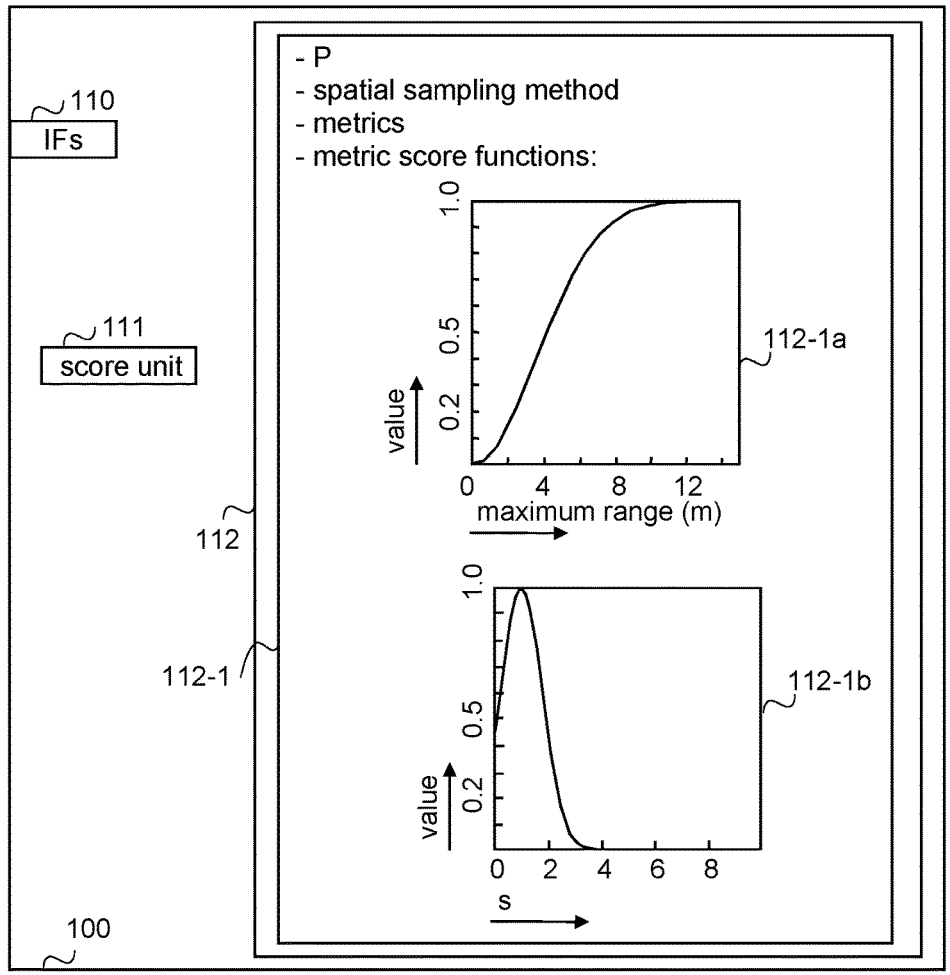
FIG. 1 illustrates an exemplified computing device.

FIG. 1 illustrates a simplified computing device describing only some logical units with their operative connections, the implementation of which may deviate from what is presented. It is obvious to a person skilled in the art that the computing device may also comprise other functions and structures that need not be described in greater detail here, or be part of a computing environment comprising one or more computing devices. The more detailed structure of the computing device or a computing environment is irrelevant to the actual invention, and therefore is not described in more detail herein.

Referring to FIG. 1, the computing device 100 may be any computing apparatus that can be configured to run at least one application that is configurable at least to calculate location scores to different environments. For that purpose the computing device 100 comprises one or more interfaces (IF)s 110 to input environment information and output location scores, a score unit 111 to calculate the location scores, and in the illustrated example in a memory 112 settings 112-1 for the score unit. In the illustrated example the settings 112-1 comprise a preconfigured transmission power P value, a spatial sampling method to be used when metrics are calculated, metrics to be calculated and metric score functions. Examples of the spatial sampling method will be described with FIGS. 2, 4, 5 and 6. A metric provides a value for a single property of a radio signal coverage pattern for a specific location. In other words, a metric is a parameter that depicts the specific location with its surroundings as an installation point of an access point. There is no limitation what can be used as a metric. Non-limiting examples of metrics include a maximum range, a pattern directivity, a local median distance to a map median distance share and a distance from a planning area edge. Metric score functions are used for calculating metric scores from metrics. A metric score is a result of a metric score function that is a quality function depicting quality of a metric value, i.e. how good the value is. One may say that the metric score function is a kind of quality scale function. In the illustrated example, the metric score functions in the settings 112-1 for the score unit comprises a function 112-1*a* for a maximum range metric score, and a function 112-1*b* for a pattern directivity metric score. Naturally, different functions for different purposes, even for the same metric, may be used. This way a metric score reflects the quality for the required situation. It should be appreciated that the settings may comprise also other information and/or only some pieces of the above described settings. The functionality of the score unit, and examples of different settings will be described in more detail below with FIGS. 2 and 4.

Further, the location scores may be output to a user via one or more display device (not shown separately in FIG. 1). A display device may be any kind of a screen or other display unit providing a graphical user interface, either external to the apparatus or integrated to the apparatus. Examples of such display devices include different screens, like a touchscreen, a display screen, a projection screen, a TV screen, and monitors, like a computer monitor and a portable display monitor. Naturally there may be other interfaces for user inputs, like keypads, memory sticks, etc.

The computing device 100 illustrated in FIG. 1 represents one example which may be implemented by one apparatus. Examples of such apparatuses include a user terminal or a workstation, such as a laptop, a smartphone, a personal computer, a tablet computer, a field device. Instead, or in addition to, a distributed computing device may be used that may use cloud computing or grid computing, or a dedicated server, for example.

Figure 2:
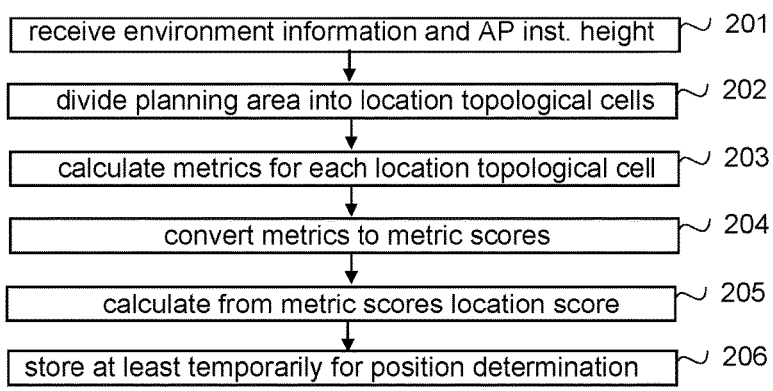
FIG. 2 illustrates an exemplified process.

FIG. 2 is a flow chart illustrating an exemplified functionality of a network planning tool configured to calculate location scores, or more precisely a functionality of the score unit providing the network planning tool the functionality to calculate location scores. In the example of FIG. 2, it is assumed that the settings in the memory comprises in addition to the preconfigured transmission power P value, the spatial sampling method, the metrics and the metric score functions, also a preconfigured frequency value, a preconfigured received signal strength indicator limit, $rssi_{min}$, and a preconfigured maximum estimated range for a predicted signal, without limiting the functionality to such a solution. Naturally, instead of having the settings in the memory, any of the settings may be received as a user input. The preconfigured values may be used since the purpose is to model the environment, not the access point.

Referring to FIG. 2, environment information and an access point installation height are received in step 201. The receiving covers herein also retrieving information from a memory. The environment information, or at least part of it, may be received, for example, as a stored data, for example as a 3D model, retrieved to be used. The environment information defines the planning environment preferably in 3D. For example, for a building it defines locations, thicknesses, materials, etc., for walls (outer walls, inside walls), floors (including roofs), windows, elevator shafts, etc. The access point installation height may be part of the environment information received, or received separately, for example by prompting the user to provide it. The access point installation height affects to the metrics, since the radio propagation properties, and hence the metrics, depend on the 3D location from where the different metrics are calculated. However, it is assumed that the access point installation height is the same within a planning area. As a summary, the environment information comprises at least planning area definitions, and information on propagation obstacles in the planning area, such as their dimensions and attenuation factors.

The planning area is divided in step 202 into a plurality of location topological cells. The location topological cells define the locations for which the metrics are calculated. One way to determine the location topological cells is to use a simple grid laid over at least the planning area, a single box in the grid being a location topological cell. However, other ways to divide the planning area into location topological cells may be used as well.

Then for each location topological cell a plurality of metrics is calculated in step 203. The signal propagation is preferably estimated for each direction around the access point. Basically an omnidirectional antenna is used as a default. By assuming use of an omnidirectional antenna it is ensured that the directivity of an antenna is not affecting to the estimated metrics. In other words, it is ensured that only the environment affects to the values of the metrics. However, calculating values for all directions a between 0 and $2\pi$ to determine a metric would result to a huge amount of calculations, and thereby would take quite a lot of time. The purpose of the spatial sampling method is to decrease the number of calculations needed, and thereby speed up the calculations. An example of a spatial sampling method is a preconfigured degree step value that defines an amount a direction, starting with value $\alpha=0$, is increased, to define the next direction, called herein also a calculation direction, to which the metrics are calculated. For example, the degree step may be 0.09 rad (corresponding to 5°). It should be appreciated that any value for the degree step may be used. Another example of the spatial sampling method is an equation for a spiral, such as an equation for Fermat's spiral that is also known as a parabolic spiral. Comparing the spiral and the degree step, the latter requires less computational resources but as a side effect the degree step contains a risk, especially farther away from the point to which metrics are calculated, that there will be areas/spaces in which no values for metrics are calculated. Using the spiral a better coverage is obtained, and yet the need for computational resources will not increase very much. Still a further example of the spatial sampling method is a grid definition, by means of which a grid may be created in such a way that a grid vertex locates at the intended access point installation height, and metrics are calculated in other vertices of the grid. The grid definition may be a value defining a size dimension of a unit cube in a Cartesian grid, or the grid definition may comprise values with which another kind of a grid may be created. It should be appreciated that the above are nonlimiting examples of what the spatial sampling method may be. Any method or means to select points, at which values for one or more metrics are to be calculated, may be used.

In the examples below, the maximum range and pattern directivity are used as examples of the plurality of metrics without limiting the examples to use of the two metrics mentioned.

The maximum range is a metric that estimates how far away from a radio placed to a location, a received signal strength indicator (rssi) is still above the limit, $rssi_{min}$. The limit may be set freely. The maximum range is selected amongst ranges calculated for different directions, a range defining for a direction a distance between the radio and a point within a planning area in which the received signal strength indication is still above the limit in the direction. Referring to an example illustrated in FIG. 3, when the radio, and the access point, are placed to point X 301, the dashed line represents an estimated border 310 of a range within a planning area, in which the received signal strength indicator is estimated to be the same as the limit. Outside the border, from the access point view, the received signal strength indicator is estimated never to be above the limit. However, within the border, there may be spots in which the received signal strength indicator is estimated not to be above the limit. The arrows 311, 312 depict ranges in different directions. The irregular form of the estimated border 310 is caused by propagation obstacles in the planning area.

For example, following equation (1), using a free space path loss model and a wall model developed by Keenan and Motley, that allows take into account the environment, such as walls, floors, and other obstacles, may be used to calculate rssi values by using equation (1) with different distances, and comparing the result to the limit to determine range.

$$\text{rssi} = P - 20 \log_{10}(d) - 20 \log_{10}(f) + 27.55 - \Sigma d_w F_w - \Sigma d_f F_f \quad (1)$$

wherein

P=preconfigured transmission power, d=distance from access point's position in meters f=default frequency in MHz, $d_w$=length of a cut of a direct ray inside a wall w in the calculation direction, $F_w$=attenuation factor of the wall w, $d_f$=length of a cut of a direct ray inside a floor f in the calculation direction, $F_f$=attenuation factor of the floor, and rssi=received signal strength indicator.

When the preconfigured transmission power P is set to be smaller than the actual transmission power, the amount of calculations to determine ranges may be limited to be reasonable.

When the ranges in different directions have been calculated, the longest one may be selected to be the value of the maximum range metric. Another example includes using a statistical measure, such as 95 percentile of the ranges as the value of the maximum range metric.

Figure 3:
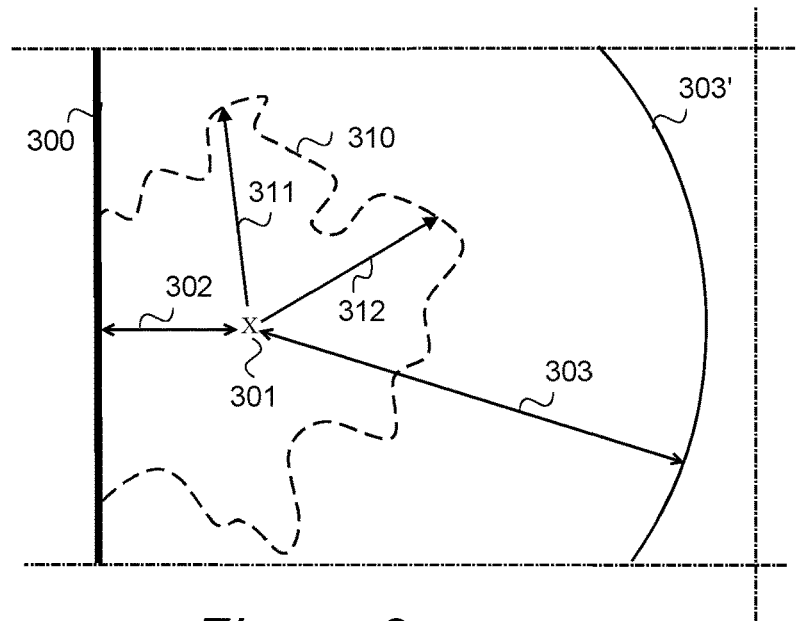
FIG. 3 illustrates an example of a coverage pattern.

The pattern directivity is a metric describing how the environment modifies a radio signal coverage pattern, as is illustrated by the irregular form of the estimated border 310 in FIG. 3. (The area within the estimated border depicts the radio signal coverage pattern.)

The pattern directivity may be calculated comparing the maximum range determined as described above, and comparing it to a weighted average range of all ranges, for example using equation (2):

$$s = \frac{\text{max range}}{\overline{\text{range}}} \quad (2)$$

wherein s=pattern directivity, max range=maximum range selected amongst ranges determined using equation (1) and the limit $\text{rssi}_{min}$ for the received signal strength indicator, and $\overline{\text{range}}$=average range calculated using equation (3).

$$\overline{\text{range}} = \frac{\sum_{\alpha=0}^{2\pi} w(\alpha) \, \text{range}(\alpha)}{\sum_{\alpha=0}^{2\pi} w(\alpha)} \quad (3)$$

wherein range ($\alpha$)=range in a calculation direction $\alpha$, determined using equation (1) and the limit $\text{rssi}_{min}$ for the received signal strength indicator, and w ($\alpha$)=weight calculated using equation (4).

$$w(\alpha) = \frac{\text{space}(\alpha)}{\text{test}_{max}} \quad (4)$$

wherein space($\alpha$)=distance in the calculation direction $\alpha$ from the location to the edge of the environment or the $\text{test}_{max}$, whichever is smaller, and $\text{test}_{max}$=maximum estimated range for a predicted signal.

The parameter space($\alpha$) is a parameter taking into account that the outer edge of the environment where the network is planned, i.e. where the planning area ends, is a logical limitation for the ranges for locations near the outer edge. For example, using the example in FIG. 3, if a location is near the planning area edge 300, an omnidirectional radiation pattern, even if obtainable in theory, would not be realizable in practice for the planning area. Therefore, from the location, if the calculation direction is towards the area edge, the parameter space($\alpha$) will be given a short value, depicted by 302, whereas on the other directions the value may be much bigger.

The preconfigured maximum estimated range for a predicted signal may be a default value, stored to the memory, or it may be preconfigured as a function, such as "a maximum theoretical distance between extreme points within the planning area". The default value may be based on a maximum range in an average environment, for example. The value is preferably big enough, so that the weight will be smaller than one. Naturally a value for the maximum estimated range may be received as user input. In the example in FIG. 3, the maximum estimated range for a predicted signal is depicted by the radius 303, and a corresponding arc 303'.

In another solution, instead of calculating the average range as a weighted average, an arithmetic mean of different ranges in different directions may be used.

Once the plurality of metrics, i.e. in the example the maximum range and the pattern directivity have been calculated, the metrics are converted in step 204 to metric scores.

For example, the function 112-1a of FIG. 1 is used to convert the maximum range to a maximum range score, and the function 112-1b of FIG. 1 is used to convert the pattern directivity to pattern directivity score.

In the illustrated example of FIG. 1, when the maximum range is 0, also the metric score is 0, and when the maximum range increases, also the metric score increases so that the maximum metric score 1 is achieved in the illustrated example with a maximum range 10 meters or more. It should be appreciated that any other dependency between the range and the metric score may be given.

As for the pattern directivity, the function for converting is based on the fact that when the value of s is 1, the pattern in the environment is omnidirectional. Therefore the function 112-1b of FIG. 1 gives the highest score (which is 1) when s is 1, and the score decreases when s is smaller than 1 or bigger than 1. In the illustrated example, when s is 0 the pattern directivity score is about 0.45, and with pattern directivity s values about 3.5 and bigger, the pattern directivity score is zero indicating a directional pattern. It should be appreciated that any other dependency between the pattern directivity score and the pattern directivity s may be given.

When the metrics have been converted to corresponding metrics scores, a location score is calculated in step 205 for each location topological cell, from the corresponding metric scores. The location score may be a product of individual metric scores or a sum of individual metric scores or a geometric mean or an arithmetic mean or the minimum, for example. It should be appreciated that there are no restrictions how to calculate the location score. If the location score is the product of individual metric scores or the geometric mean or the minimum, it differentiates the location topological cells rather efficiently: if one metric value indicates a bad location, i.e. the value is near zero, or zero, the location score will indicate also a bad location as an access point placement position.

When the location scores have been calculated, i.e. each topological cell has its own location score, the topological cells and associated location scores are stored in step 206 at least temporarily to be used for aiding to determine final positions of access points or for determining the final positions.

Figure 4:
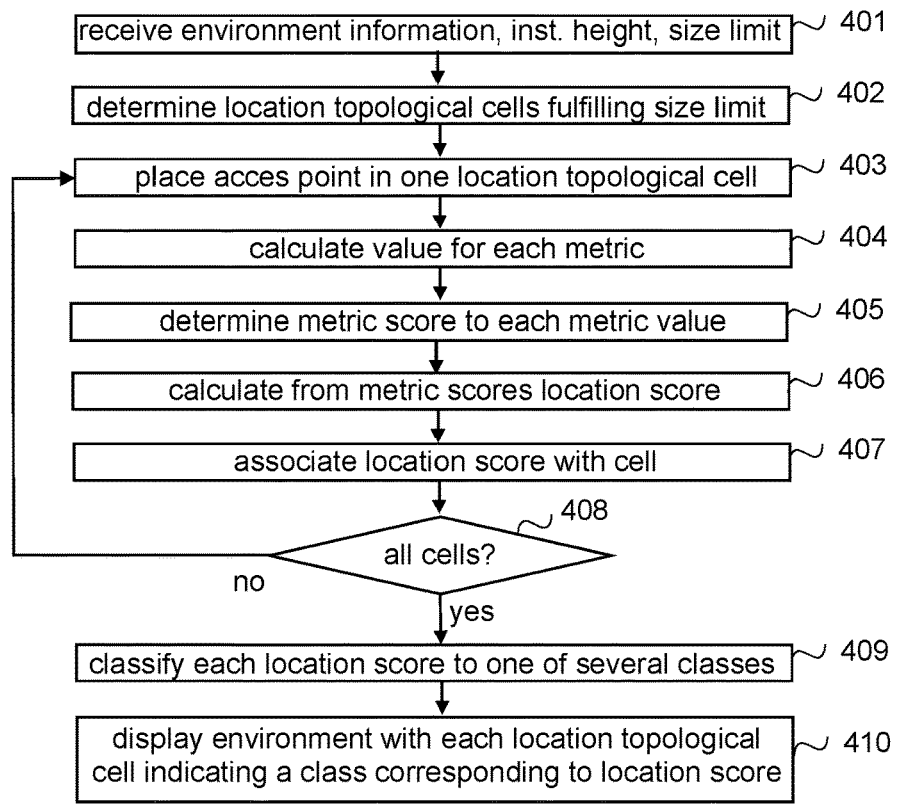
FIG. 4 illustrates another exemplified process.

FIG. 4 is a flow chart illustrating another exemplified functionality of a network planning tool configured to calculate location scores, or more precisely a functionality of the score unit providing the network planning tool the functionality to calculate location scores. In the example of FIG. 4 it is also assumed that the settings in the memory comprises in addition to the preconfigured transmission power P value, the spatial sampling method and the functions, also a preconfigured frequency value, a preconfigured received signal strength indicator limit, $rssi_{min}$, and a preconfigured maximum estimated range for a predicted signal, without limiting the functionality to such a solution. Also herein, any of the settings may be received as a user input.

In the illustrated example of FIG. 4 it is assumed that environment information, access point installation height and a size limit are received in step 401 as a user input. Since the size limit is a parameter, it may also be part of the settings stored to the memory.

Once the environment information is received, location topological cells fulfilling the size limit are determined in step 402. As described above, one way to determine the location topological cells is to use a simple grid laid over outer boundaries of the planning area received in the environment information. However, to estimate properties in places where the properties are expected to change, like different sides of each walls, a polygon triangulation based on the environment layout, taking into account walls, shafts, etc. may be used to determine the location topological cells. As is known, the polygon triangulation decomposes a polygonal area A into a set of triangles, i.e. finds a set of triangles with pairwise non-intersecting interiors whose union is A. Each triangle is a location topological cell for which a location score will be calculated. A further advantage using the polygon triangulation is that there will be smaller location topological cells in areas the location score is most needed, i.e. there is a change in the environment that may change also the properties, and larger location topological cells in areas in which the properties do not change so much. This means that the calculation concentrates in critical areas, providing a more accurate estimation of the goodness of the location. An example of a location topology with different sizes of location topological cells, two location topological cells 501, 501' denoted as an example, as a result of the polygonal triangulation is illustrated in FIG. 5. The size limit may be a maximum length 510 for a triangle side, for example. The size limit ensures that a size of a triangle remains small enough between neighbor sample points.

When the location topological cells have been determined, i.e. a location topology is ready, location scores for the location topological cells are calculated. More precisely, the access point having at a height, received in step 401, an omnidirectional radio antenna is placed in step 403 in a centroid of one location topological cell, and values for each metric is calculated in step 404 for the access point placed in that specific location. For example the maximum range and the pattern directives may be calculated as described with FIG. 2. Then the values of the metrics are converted, for example as described with FIG. 2, in step 405 to metric scores. If the same conversion functions as in FIG. 2 is used, each metric score is within the range 0 to 1.

Once the metric values have been converted to metric scores, a location score is calculated in step 406 for the location topological cell. In this example a location score is calculated so that its value is within a range 0 (very poor location) to 100 (very good location) by using following equation (5) to calculate the location score:

$$l_{score} = 100 * \sqrt[n]{\prod_{k=1}^{n} m_k} \qquad (5)$$

wherein
$l_{score}$=location score,
n=the number of metrics used,
k=metric index, starting from 1, ending to n, and
m=metric score calculated in step 405.

In other words, the location score is based on product of individual metric scores, and one poor metric score results to a poor location score.

When the location score for the location topological cell has been calculated, the location score value is associated in step 407 with the location topological cell. Then it is checked in step 408, whether or not all location topological cells are associated with a location score value. If not (step 408: no), the process proceeds to step 403 to place the access point to a centroid of a location topological cell which does not yet have an associated location score value.

If all location topological cells are associated with a corresponding location score value (step 408: yes), the location scores are ready to be used for automatic placement of access points.

However, in the illustrated example, the process is also configured to display the goodness of different locations to a user. These displayed values may be used to manually place the access points, or to check that the automatic planning tool places them correctly. To display the goodness, each location score value is classified in step 409 to one of plurality of classes defined. For example, following classification may be used:
location score value ≤25 is classified as a bad location for placement 25<location score value ≤50 is classified as a rather bad location for placement, not recommendable location 50<location score value ≤75 is classified as a rather good location for placement, an optional location location score value >75 is classified as a good location for placement Once all location score values have been classified, the environment showing location score value classes may be displayed in step 410. FIG. 6 shows an example what can be displayed.

FIG. 6 shows part of a planning area, i.e. environment in an example in which a grid is used to determine location topology. In FIG. 6 the thick solid lines depict interior walls, the double dashed line depict an elevator shaft and the dashed line depicts an outer wall.

As can be seen from the FIG. 6, locations in which the signals from an access point would be strongly blocked, like the elevator shaft, are indicated as bad locations for placements, thanks to low location scores. Also hallways in which the signal would be a directional signal due to the signal propagating via the hallway very far but attenuates very strongly to other directions are indicated as bad locations. The directive signal in a hallway may interfere with signals of several other access points, whereas an access point placed in a room next to a hallway, provides coverage to the hallway but because of the walls will attenuate the signal, it is not propagated so far, and hence will not interfere with signals from so many other access points than if placed in the hallway. Further, if there is a directional signal coverage pattern, large variations in signal strength within a short distance may be experienced. For example, when a user first walks in the hallway and then turns into a room, the signal strength may drop rapidly, and a fast handover to another access point should take place. Hence, an access point position providing a close to omnidirectional pattern is preferred since it prevents rapid signal level alternations within short distances and gives more time for handovers. Unlike in FIG. 6, usually interior walls and elevator shafts are not shown so clearly, and realizing their existence and location requires a detailed inspection of a building plan, and knowledge on drawing markings, such as how different materials etc. are drawn.

It should be appreciated that the above illustrated ranges for location scores are only exemplary, and any other ranges may be used.

Figure 7:
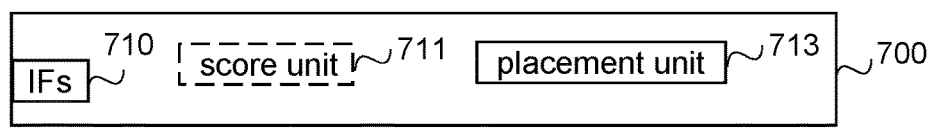
FIG. 7 illustrates another exemplified computing device.

FIG. 7 illustrates another simplified computing device 700.

Referring to FIG. 7, the computing device 700 may be any computing apparatus that can be configured to run at least one application that is configurable at least to initially place access points, and determine final positions of access points based on calculated location scores. For that purpose the computing device 700 comprises one or more interfaces (IF)s 710 to receive as input environment information and to output at least final positions, and a placement unit 713 for initially placing access points and for determining final positions. Otherwise the computing device 700 may be similar to the one illustrated in FIG. 1 with a corresponding location score unit 701 and corresponding information stored to a memory (not illustrated in FIG. 7). The more detailed description is not repeated in vain herein. However, if location scores, or any corresponding location quality values, are received via an interface 710, for example as part of environment information, the computing device 700 may be implemented without the score unit 711.

Naturally the score unit and the placement unit may be integrated together.

Figure 8:
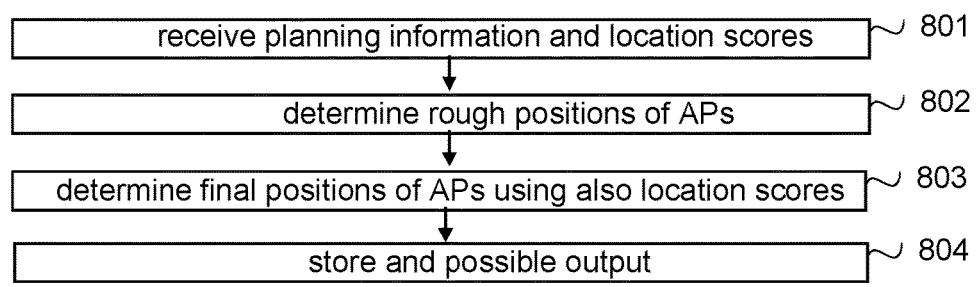
FIGS. 8 and 9 illustrate other exemplified processes.

FIG. 8 is a flow chart illustrating functionality of a network planning tool configured to determine positions of access points. More precisely it illustrates functionality of the placement unit. In the illustrated example it is assumed that the location scores are received.

Referring to FIG. 8, at least planning information and location scores are received in step 801. The receiving means herein receiving as a user input and retrieving from a memory. Since the location scores are received, not calculated, it is not necessary to receive all environment information. Therefore in the illustrated example planning information is received. The planning information may at the simplest be outer boundaries of the planning area and the number of access points that are to be placed. The location scores in this example mean any location quality values. The location scores may be previously calculated, stored to the memory. The location scores may be received via user interface: as one or more user inputs indicating location topological cells in the planning area and inputting location scores to the location topological cells. The location scores may be received as a combination: partly as previously calculated location scores, partly as user input(s) updating/replacing/adding values to some location topological cells. It may further be that a default location score is used for location topological cells to which no other value were received as a user input.

The planning information is used in step 802 to determine rough positions of the access point. For example, the planning area may be divided into as many sub-areas, for example rectangles, as is the number of access points, and the rough positions of the access points are the midpoints of the subareas. Different spatial clustering algorithms may also be used to determine initial positions. An example of using a spatial clustering algorithm to determine initial positions is described below with FIG. 9. In one embodiment instead of determining rough positions of the access points, the rough positions are received.

Then the final positions, starting from the rough positions as initial positions and using the location scores and the planning information, are determined in step 803. For example, each access point may be placed to a mid-point of a location topological cell having the best location score within a preset distance from the initial position. A spatial clustering algorithm, using location scores as weights, may be used. An example how to combine a spatial clustering algorithm, the outer boundaries and the location scores is described below with FIG. 9. Yet a further alternative is to output (i.e. display) the location scores, the outer boundaries, possibly other planning information, and the initial positions so that a person planning the network uses the location scores to fine-tune the initial positions.

When the final positions of the access points are determined, they are stored in step 804 as a network plan. Naturally, the network plan may be outputted to a user.

Figure 9:
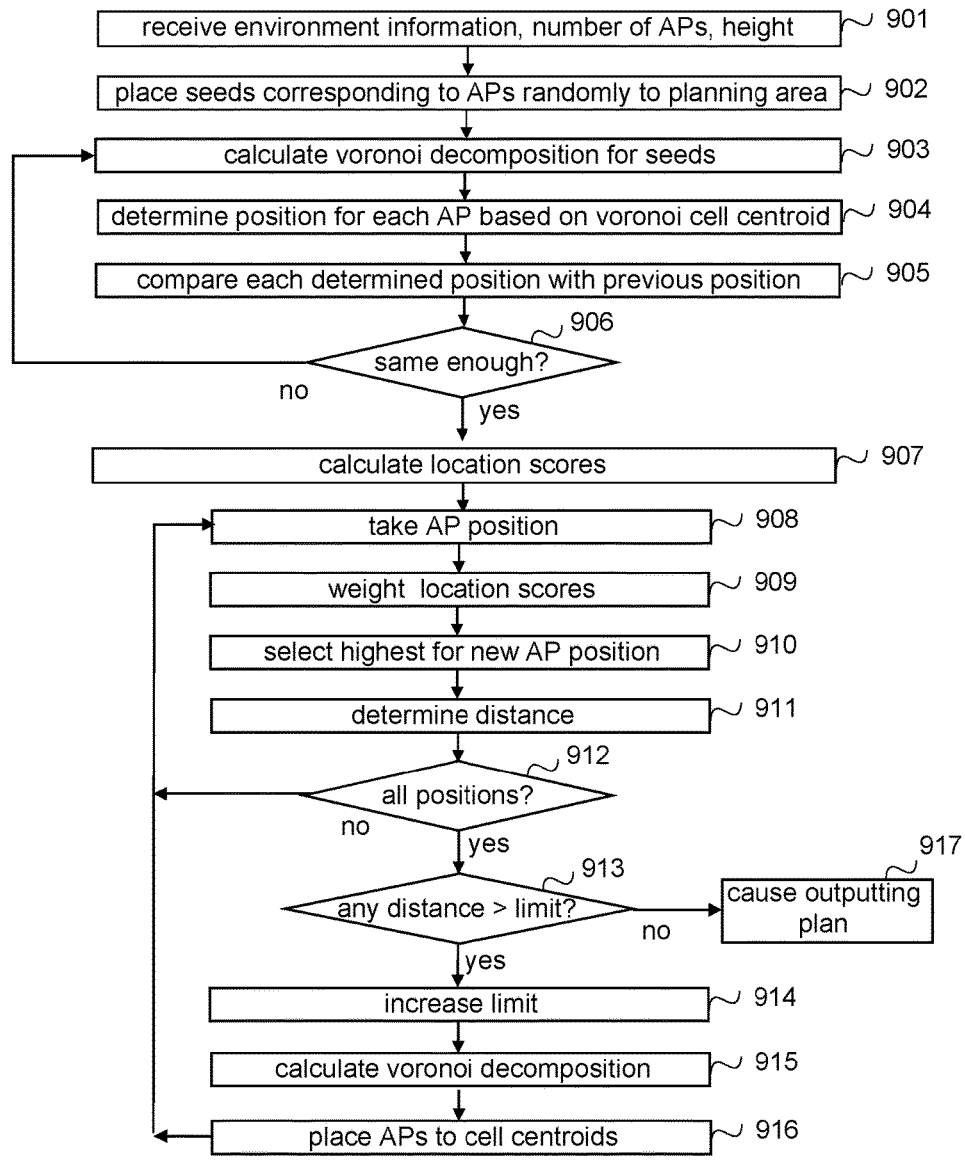

FIG. 9 is a flow chart illustrating another exemplary functionality of a network planning tool configured to determine positions of access points. More precisely it illustrates an example of how the placement unit defines initial positions, how it interacts with the location score unit, and how it defines final positions of access points.

In the illustrated example of FIG. 9, it is assumed that environment information, access point installation height are received in step 901, for example as was received in step 201 of FIG. 2 and in step 401 of FIG. 4. However, in the described process also the number of access points is received in step 901.

Then as many points as is the number of the access points are placed in step 902 randomly to an area in a plane, the area having the same outer shape as is defined in the received environment information for the planning area. Next, a voronoi decomposition of the points, called also as seeds, in the area is calculated in step 903, using Lloyd's algorithm, or Lloyd's weighted algorithm. In other words, for each point a voronoi cell is determined. The voronoi cell is a region, i.e. a specific subset of the area, in which all points in the subset are closer to the seed (the original point) than to any other seed. Then for each voronoi cell its centroid is determined in step 904, and for each voronoi cell the location of a centroid is compared in step 905 with the location of the seed, i.e. the point based on which the voronoi cell was created. If they are not the same enough (step 906: no), the process continues to step 903 to calculate a voronoi decomposition, using this time the centroids determined in step 904, i.e. points corresponding to access point positions, as locations of the seeds. If they are same enough (step 906: yes), the placement unit that has executed the steps 902 to 906 has determined initial (rough) positions for the access points. Positions are same enough if a difference between the positions is within a range, for example corresponding to a preset limit described below with step 913.

Then in the illustrated example the score unit calculates in step 907 the location scores as described above with FIG. 2 or FIG. 4, or as described in FIG. 4 with steps 401 to 407. Naturally the score unit may have calculated the location scores in parallel with the placement unit determining initial positions.

Then positions for the access points are processed one by one. In other words, an access point position, is taken in step 908 to be processed. In the first iteration phase the access point position is the initial position. Then location scores are weighted in step 909 with distance weight function from the access point position currently under process. The distance weight function has value 1 with distance 0 and the value decreases as a function of distance, for example linearly, until some selected maximum distance is reached after which the value will be a constant value near zero. Non zero minimum weight is used to avoid the situation where no position would exist. Depending on the implementation, during the weighting original location score values or values based on the classification may be used. The location topological cell with the highest weighted score is then selected in step 910, and its centroid is selected to be a new access point position. Further, the distance between the new access point position and the previous access point position is determined in step 911. Then it is checked in step 912, whether or not a new position has been determined to all access points. If not (step 912: no), the process continues to step 908 to take an access point position to be processed.

If a new position has been determined for all access points (step 912: yes), it is checked in step 913, whether any of the distances determined in step 911 exceeds a preset limit. If yes (step 913: yes), the limit is increased in step 914, and the process calculates in step 915 the voronoi decomposition using the new positions as seeds, and then access point positions are placed in step 916 to voronoi cell centroids. Then the process returns to step 908 and takes an access point position that is one of those determined in step 916, and continues the process to determine new position.

If none of the distance exceed the limit (step 913: no), the positions for access points are ready, and in the illustrated example outputting the plan is caused in step 917. Naturally the plan will be stored.

Thanks to the above described combined use of location scores and spatial clustering algorithm, location-specific quality information that is discontinuous by nature, will be taken into account.

As is evident from the above, the present invention is applicable to be used with any wireless network planning application. The type of the wireless networks is irrelevant. For example, one or more plans may be for a network according to fifth generation (5G) system, beyond 5G, and/or wireless networks based on IEEE 802.xx specifications, such as IEEE 802.11 (WLAN) and IEEE 802.15, or any combination thereof. 5G has been envisaged to use a so-called small cell concept including macro sites operating in co-operation with smaller local area access points (access nodes), and perhaps also employing a variety of radio technologies. 5G system may also incorporate both cellular (3GPP) and non-cellular (e.g. IEEE) technologies.

The steps and related functions described above in FIGS. 2, 4, 8 and 9 are in no absolute chronological order, and some of the steps may be performed simultaneously or in an order differing from the given one. Other functions can also be executed between the steps or within the steps. For example, the user may be prompted to provide one or more of the values described above as preconfigured values, either without any preconfigured value, or as an alternative to a default value (that is the preconfigured value). Another example includes sorting the weighted location scores to a descending order before selecting the one having the highest weighted location score in step 909 of FIG. 9. Some of the steps or part of the steps can also be left out or replaced by a corresponding step or part of the step. For example, steps 902 to 905, i.e. determining the initial positions using the voronoi decomposition may be replaced by receiving the initial positions as user input.

The techniques and methods described herein may be implemented by various means so that an apparatus (computing device) configured to provide multi band network planning tool based on at least partly on what is disclosed above with any of FIGS. 1 to 9, including implementing one or more functions/operations described above with an embodiment/example, for example by means of any of FIGS. 2, 4, 8 and 9, comprises not only prior art means, but also means for implementing the one or more functions/ operations of a corresponding functionality described with an embodiment, for example by means of any of FIGS. 2, 4, 8 and 9, and it or they may comprise separate means for each separate function/operation, or means may be configured to perform two or more functions/operations. For example, one or more of the means and/or the score unit and/or the placement unit described above may be implemented in hardware (one or more devices), firmware (one or more devices), software (one or more modules), or combinations thereof. For a hardware implementation, the apparatus(es) of embodiments/examples may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 2, 4, 8 and 9, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the computing device (apparatus) described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 10:
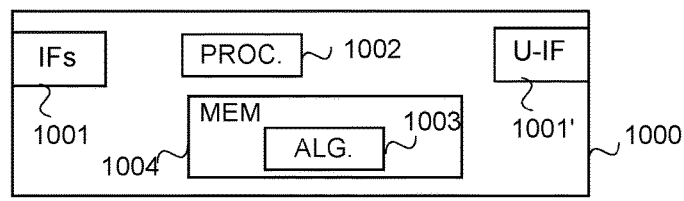
FIG. 10 is a schematic block diagram.

FIG. 10 provides an apparatus according to some embodiments of the invention. FIG. 10 illustrates an apparatus configured to carry out the functions described above in connection with the computing device. Each apparatus 1000 may comprise one or more processing circuitry, such as at least one processor 1002, and at least one memory 1004, including one or more algorithms 1003, such as a computer program code (software) wherein the at least one memory and the computer program code (software) are configured, with the at least one processor, to cause the apparatus to carry out any one of the exemplified functionalities of the computing device. The apparatus may further comprise different interfaces 1001, such as one or more user interfaces 1001'.

Referring to FIG. 10, at least one of the processing circuitries in the apparatus 1000 is configured to provide the score unit and/or the placement unit, or any corresponding sub-unit, and to carry out functionalities, described above by means of any of FIGS. 2, 4, 8 and 9, by one or more circuitries.

The memory 1004 or part of it may be implemented using any suitable data storage technology, such as semiconductor based memory devices, flash memory, magnetic memory devices and systems, optical memory devices and systems, fixed memory and removable memory.

The one or more interfaces 1001 may comprise communication interfaces comprising hardware and/or software for realizing communication connectivity according to one or more communication protocols.

The one or more user interfaces 1001' may be any kind of a user interface, for example a screen, microphone and one or more loudspeakers for interaction with the user.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a computing device.

In an embodiment, the at least one processor, the memory, and the computer program code form processing means or comprises one or more computer program code portions for carrying out one or more operations according to any one of the embodiments of FIGS. 2, 4, 8 and 9, or operations thereof.

Embodiments as described may also be carried out in the form of a computer process defined by a computer program or portions thereof. Embodiments of the methods described in connection with FIGS. 2, 4, 8 and 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a per-son of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A computer implemented method comprising:
   receiving environment information comprising at least planning area definitions, information on propagation obstacles in the planning area, and access point installation height;
   dividing the planning area into plurality of location topological cells;
   calculating for each location topological cell a plurality of metrics of different types, wherein the plurality of metrics provides values for different properties of a radio signal coverage pattern, one metric providing one or more values for a single property;
   converting each metric to a metric score;
   calculating for each location topological cell a location score from a plurality of metric scores corresponding the plurality of calculated metrics for the location topological cells wherein a location score is a value depicting the quality of a corresponding location topological cell as an installation point of an access point with the access point installation height; and
   storing at least temporarily the location scores associated with corresponding location topological cell for a computerized wireless network planning tool to provide information for determining of final locations of access points in a wireless network that is being planned.

2. The computer implemented method of claim 1, further comprising:
   receiving in the information on propagation obstacles dimensions and attenuation factors of the propagation obstacles; and calculating for each location topological cell in a three dimensional space to a plurality of directions at least a maximum range at which a received signal strength is not anymore above a limit and a pattern directivity indicating how environment modifies a radio signal coverage pattern.

3. The computer implemented method of claim 1, further comprising using metric-specific functions to convert each metric to a metric score having a value between zero and one.

4. The computer implemented method of claim 1, further comprising calculating the location score using the following equation:

$$l_{score} = 100 * \sqrt[n]{\prod_{k=1}^{n} m_k}$$

wherein
$l_{score}$=location score,
n=the number of metrics used,
k=metric index, starting from 1, ending to n, and
m=metric score.

5. A computer implemented method comprising:
receiving, in a computerized wireless network planning tool, planning information comprising at least information on outer boundaries of a planning area, access points and location scores with corresponding location cells within the planning area, wherein a location score is a value depicting the quality of a corresponding location topological cell as an installation point of an access point, the quality being based on a plurality of metrics of different types, wherein the plurality of metrics provide values for different properties of a radio signal coverage pattern one metric providing one or more values for a single property;
determining, by the computerized wireless network planning tool, initial positions of access points;
calculating, by the computerized wireless network planning tool, a weighted location score for each location cell per an access point position, a weighted location score being obtained using a distance from the position to the location cell and corresponding location score;
selecting, by the computerized wireless network planning tool, for each position a new position based on the weighted location scores; and
using the new positions as final positions for access points in a wireless network that is being planned.

6. The computer implemented method of claim 5, further comprising:
comparing, after the selecting and before the using, a preset limit with distances between the new positions and corresponding previous positions; and in response to any of the distances exceeding the preset limit, performing a spatial clustering algorithm to the planning area to determine voronoi cells, the spatial clustering algorithm using the new positions as seeds, and updating the positions of the access points to be centroids of the voronoi cells; and
repeating the calculating, selecting, and comparing until none of the distances exceeds the preset limit.

7. The computer implemented method of claim 6, further comprising:
increasing the preset limit in response to any of the distances exceeding the preset limit; and
using the increased preset limit when the comparing is performed next time.

8. The computer implemented method of claim 6, wherein the spatial clustering algorithm is Lloyd's algorithm or weighted Lloyd's algorithm.

9. The computer implemented method of claim 5, wherein the determining initial positions of access points comprises, when received information on the access points is a number of access points to be placed to the planning area:
using the number to place corresponding number of seeds randomly to the planning area to depict rough positions of access points;
performing a spatial clustering algorithm to the planning area to determine voronoi cells, the spatial clustering algorithm using the rough positions as seeds; and
determining the initial positions to be the centroids of the voronoi cells.

10. The computer implemented method of claim 9, wherein the determining initial positions of access points further comprises, after performing the spatial clustering algorithm:
determining for each rough position a new rough position that is a centroid of a corresponding voronoi cell;
comparing the new rough positions with corresponding previous rough positions; and
determining, in response to positions being same enough, the new rough positions to be the initial positions; otherwise
using the new rough positions as rough positions, performing the spatial clustering algorithm, and repeating the determining for each rough position a new rough position and the comparing.

11. The computer implemented method of claim 5, wherein the determining initial positions of access points comprises, when received information on the access points is rough positions of the access points:
performing a spatial clustering algorithm to the planning area to determine voronoi cells, the spatial clustering algorithm using the rough positions as seeds; and
determining the initial positions to be the centroids of the voronoi cells.

12. The computer implemented method of claim 11, wherein the determining initial positions of access points further comprises, after performing the spatial clustering algorithm:
determining for each rough position a new rough position that is a centroid of a corresponding voronoi cell;
comparing the new rough positions with corresponding previous rough positions; and
determining, in response to positions being same enough, the new rough positions to be the initial positions; otherwise
using the new rough positions as rough positions, performing the spatial clustering algorithm, and repeating the determining for each rough position a new rough position and the comparing.

13. The computer implemented method of claim 5, wherein the receiving the location scores comprises:
receiving environment information comprising at least planning area definitions, information on propagation obstacles in the planning area, and access point installation height;
dividing the planning area into plurality of location topological cells;
calculating for each location topological cell a plurality of metrics;
converting each metric to a metric score;

calculating for each location topological cell a location score from a plurality of metric scores corresponding the plurality of calculated metrics for the location topological cell; and storing at least temporarily the location scores associated with corresponding location topological cell to provide information for determining of final locations of access points determining of final locations of access points.

14. The computer implemented method of claim 13, further comprising:

receiving in the information on propagation obstacles dimensions and attenuation factors of the propagation obstacles; and calculating for each location topological cell in a three dimensional space to a plurality of directions at least a maximum range at which a received signal strength is not anymore above a limit and a pattern directivity indicating how environment modifies a radio signal coverage pattern.

15. The computer implemented method of claim 13, further comprising using metric-specific functions to convert each metric to a metric score having a value between zero and one.

16. An apparatus comprising
at least one processor; and
at least one memory including computer program code;
the at least one memory and computer program code configured to, with the at least one processor, cause, in response to the apparatus receiving environment information comprising at least planning area definitions, information on propagation obstacles in the planning area, and access point installation height, the apparatus at least to:
divide the planning area into plurality of location topological cells;
calculate for each location topological cell a plurality of metrics of different types, wherein the plurality of metrics provides values for different properties of a radio signal coverage pattern, one metric providing one or more values for a single property;
convert each metric to a metric score;
calculate for each location topological cell a location score from a plurality of metric scores corresponding the plurality of calculated metrics for the location topological cell, wherein a location score is a value depicting the quality of a corresponding location topological cell as an installation point of an access point with the access point installation height; and
store at least temporarily the location scores associated with corresponding location topological cell for a computerized wireless network planning tool to assist determining of final locations of access points in a wireless network that is being planned.

17. An apparatus comprising
at least one processor; and
at least one memory including computer program code for a wireless network planning tool;
the at least one memory and computer program code configured to, with the at least one processor, cause, in response to a computing apparatus receiving, for the wireless network planning tool, planning information comprising at least information on outer boundaries of a planning area, wherein a location score is a value depicting the quality of a corresponding location topological cell as an installation point of an access point, the quality being based on a plurality of metrics of different types, wherein the plurality of metrics provide values for different properties of a radio signal coverage pattern, one metric providing one or more values for a single property, access points and location scores with corresponding location cells within the planning area, the apparatus to:
determine initial positions of access points;
calculate a weighted location score for each location per an access point position, a weighted location score being obtained using a distance from the position to the location cell and corresponding location score;
select for each position a new position based on the weighted location scores; and
use the new positions as final positions for access points in a wireless network that is being planned.

18. A non-transitory computer readable medium comprising program instructions for causing, in response to a computing apparatus receiving environment information comprising at least planning area definitions, information on propagation obstacles in the planning area, and access point installation height, the computing apparatus to:
divide the planning area into plurality of location topological cells;
calculate for each location topological cell a plurality of metrics of different types, wherein the plurality of metrics provides values for different properties of a radio signal coverage pattern, one metric providing one or more values for a single property;
convert each metric to a metric score;
calculate for each location topological cell a location score from a plurality of metric scores corresponding the plurality of calculated metrics for the location topological cell, wherein a location score is a value depicting the quality of a corresponding location topological cell as an installation point of an access point with the access point installation height; and
store at least temporarily the location scores associated with corresponding location topological cell for a computerized wireless network planning tool to assist determining of final locations of access points in a wireless network that is being planned.

19. A non-transitory computer readable medium comprising program instructions for causing, in response to a computing apparatus receiving planning information comprising at least information on outer boundaries of a planning area, access points and location scores with corresponding location cells within the planning area, wherein a location score is a value depicting the quality of a corresponding location topological cell as an installation point of an access point with the access point installation height the computing apparatus to:
determine initial positions of access points;
calculate a weighted location score for each location per an access point position, a weighted location score being obtained using a distance from the position to the location cell and corresponding location score;
select for each position a new position based on the weighted location scores; and
use the new positions as final positions for access points in a wireless network that is being planned.

20. A computer implemented method comprising:
receiving, by the computerized wireless network planning tool, environment information comprising at least planning area definitions comprising at least information on outer boundaries of a planning area and access points, information on propagation obstacles in the planning area, and access point installation height;

dividing, by the computerized wireless network planning tool, the planning area into plurality of location topological cells;

calculating, by the computerized wireless network planning tool, for each location topological cell a plurality of metrics of different types, wherein the plurality of metrics provides values for different properties of a radio signal coverage pattern, one metric providing one or more values for a single property;

converting, by the computerized wireless network planning tool, each metric to a metric score;

calculating, by the computerized wireless network planning tool, for each location topological cell a location score from a plurality of metric scores corresponding the plurality of calculated metrics for the location topological cell, wherein a location score is a value depicting the quality of a corresponding location topological cell as an installation point of an access point with the access point installation height;

storing, by the computerized wireless network planning tool, at least temporarily the location scores associated with corresponding location topological cell to provide information for the computerized wireless network planning tool to determine of final locations of access points in a wireless network that is being planned;

determining, by the computerized wireless network planning tool, initial positions of access points;

calculating, by the computerized wireless network planning tool, a weighted location score for each location cell per an access point position, a weighted location score being obtained using a distance from the position to the location cell and corresponding location score;

selecting, by the computerized wireless network planning tool, for each position a new position based on the weighted location scores; and using, by the computerized wireless network planning tool, the new positions as final positions for access points in the wireless network that is being planned.

* * * * *